US008456120B2

(12) United States Patent
Wang

(10) Patent No.: US 8,456,120 B2
(45) Date of Patent: Jun. 4, 2013

(54) CONTAINER WITH TOUCH CONTROL ARRANGEMENT

(76) Inventor: Xin Wang, Fujian (CN)

( * ) Notice: Subject to any disclaimer, the term of this patent is extended or adjusted under 35 U.S.C. 154(b) by 324 days.

(21) Appl. No.: 12/807,663

(22) Filed: Sep. 10, 2010

(65) Prior Publication Data

US 2012/0000911 A1 Jan. 5, 2012

(51) Int. Cl.
*H02P 1/00* (2006.01)

(52) U.S. Cl.
USPC ........... 318/460; 318/286; 318/369; 318/282; 318/461; 49/28; 49/30; 220/211; 220/495.05; 220/495.06; 220/521; 220/523

(58) Field of Classification Search
USPC .................. 220/211, 495.05, 495.06, 595.11, 220/50, 521, 523, 522; 49/28, 30; 206/461, 206/470; 318/466, 286, 369, 282, 461
See application file for complete search history.

(56) References Cited

U.S. PATENT DOCUMENTS

| | | | | | |
|---|---|---|---|---|---|
| 4,729,490 | A | * | 3/1988 | Ziegenbein | 220/211 |
| 5,163,574 | A | * | 11/1992 | Sosan | 220/264 |
| 5,797,497 | A | * | 8/1998 | Edwards | 209/570 |
| 5,896,593 | A | * | 4/1999 | Mizrahi | 4/378 |
| 5,932,982 | A | * | 8/1999 | Pezzelli, Jr. | 318/480 |
| 6,150,939 | A | * | 11/2000 | Lin | 340/568.1 |
| 6,519,130 | B1 | * | 2/2003 | Breslow | 361/170 |
| 6,812,655 | B1 | * | 11/2004 | Wang et al. | 318/3 |
| 7,064,296 | B1 | * | 6/2006 | Harned et al. | 219/391 |
| 7,227,101 | B2 | * | 6/2007 | Harned et al. | 219/391 |
| 7,656,109 | B2 | * | 2/2010 | Yang et al. | 318/266 |
| 7,750,591 | B2 | * | 7/2010 | Wang et al. | 318/480 |
| 7,781,995 | B2 | * | 8/2010 | Yang et al. | 318/266 |
| 8,141,734 | B2 | * | 3/2012 | Wang et al. | 220/211 |
| 2007/0125306 | A1 | * | 6/2007 | Beecher | 119/51.02 |

* cited by examiner

*Primary Examiner* — Rita Leykin
(74) *Attorney, Agent, or Firm* — Raymond Y. Chan; David and Raymond Patent Firm

(57) ABSTRACT

A touch control arrangement is arranged for a container having a foldable cover being folded between an opened position and a closed position via an actuation unit. The touch control arrangement includes a power source and a touch actuator electrically linked to the power source, wherein the touch actuator is located out of the storage cavity of the container body and is arranged in such a manner that when the touch actuator is activated by a presence of a touch, the actuation unit is actuated to move the foldable cover from the closed position to the opened position.

24 Claims, 12 Drawing Sheets

CONTAINER WITH TOUCH CONTROL ARRANGEMENT

BACKGROUND OF THE PRESENT INVENTION

1. Field of Invention

The present invention relates to a container, and more particularly to a touch control arrangement of a container, wherein the folding movement of the foldable cover of the container is adapted to be accurately operated through the touch control arrangement so as to minimize the false operation of the foldable cover.

2. Description of Related Arts

A conventional container for storing predetermined objects, such as a trash container, usually comprises a container body having a receiving cavity formed therein, and an opening communicated with the receiving cavity, and a cover panel movably mounted on top of the container body for selectively opening and enclosing the receiving cavity for allowing the user to dispose predetermined objects into the container body. When the container is not in use, the receiving cavity is substantially enclosed for physically separating the objects disposed in the receiving cavity from an exterior of the container.

In a number of situations, such as when a person is holding a lot of trash in both of his hands, it is inconvenient or difficult for the person to lift up the cover panel in that the person simply does not have spare hands to lift up the cover panel. If the person nevertheless tries to lift up the cover panel, he risks dropping all the trash in his or her hands onto the floor.

Because of this deep-seated difficulty with respect to the above-mentioned conventional container, there exist several other kinds of containers in which the cover panels are mainly designed to be actuated by feet instead of hands. These containers with foot operating mechanism have substantially solved the problem of inconvenient or difficult lifting of the cover panel when the user has a lot of, say, trash, in his or her hands. However, they create other problems. For example, a substantially amount of force has to be applied to the foot paddle in order to lift up the cover panel. This may perhaps pose a certain degree of difficulty for such users as children and elderly. Moreover, since the operation of the containers is mainly relies on stepping force on the part of the user, the foot paddle would break very easily especially when people apply unknowingly excessive stepping force on it.

In recent years, electrically-operated containers have been developed in which the cover panel is largely driven by electrical components so as to achieve automatic opening or closing of that cover panel. For most of these electrically-operated containers, such as electrically-operated trash cans, a sensor is utilized for detecting a target movement, such as a movement of the person throwing trash, in a detection range, so that when that person stands in that detection range, the sensor will send a signal to the relevant electrical components so as to automatically lift up the cover panel, and when the user has left the detection range, the sensor will send a corresponding signal to those electrical components for automatically lowering down the cover panel so as to close the container.

There are a number of disadvantages in relation to this kind of electrically-powered containers. First, virtually all electrically-powered containers employed some sorts of sensors for detecting user's position so as to determine the exact time at which the cover panel is to be automatically actuated. However, the position of the sensors with respect to the corresponding container body may not be optimal so that the cover panel may be unnecessarily lifted up. This result may also occur when the sensor is too sensitive. Conversely, when the sensor is too insensitive, there may occur a situation where the cover panel does not lift up when in fact it is necessary.

Second, it is well-known in the art that when the cover panel is electrically-powered, it is difficult to effectively control the actual physical motion of the cover panel, especially when the cover panel is driven to lower down to cover the container body. More specifically, when the cover panel is pivotally moved to enclose the container body, gravitational force (due to the weight of the cover panel) has largely been ignored by many so that the cover panel is usually subject to excessive force when being driven to enclose the container body. As a result, it is suggested that some sort of mechanisms is required to actually controllably resist the gravitational force when the cover panel is driven to enclose the container body so as to prevent accidental damage to the electrical components, the container body, or even the cover panel itself.

Third, for some electrically-powered containers (such as trash cans), because of their utility function, are usually placed in an environment which not clean. Similarly, the objects which are to be disposed into the receiving cavity of the container body may contain liquid. All these adverse factors may eventually affect the durability of the electrical components of the relevant electrically-powered containers. Therefore, protection of the electrical components within the container is a very important issue.

Fourth, the induction unit of the electrically-powered container consumes relatively more electrical power. The sensor will draw a certain amount of electrical power even when the sensor is remained at the standby mode. In other words, the electrically-powered container will keep consuming the electric power from the power source even though the electrically-powered container is not in use.

Fifth, when the trash bag as an example is needed to be replaced from the electrically-powered container, the induction unit must be unplugged from the terminal. In other words, it is hassle that the user must detach the induction unit from the container before replacing the trash bag. In addition, the terminal of the electrically-powered container will be gradually oxidized or dirt under the unclean environment. Therefore, the terminal might not be perfectly connected to the induction unit so as to cause the malfunction of the electrically-powered container.

Sixth, the induction unit is supported within the receiving cavity of the container such that the usage volume of the electrically-powered container is minimized. Accordingly, the above mentioned non-electrically-powered container has the same problem of minimizing the usage volume of the container since the foot operating mechanism is also supported within the receiving cavity of the container.

SUMMARY OF THE PRESENT INVENTION

The invention is advantageous in that it provides a touch control arrangement of a container, wherein the folding movement of the foldable cover of the container is adapted to be accurately operated through the touch control arrangement so as to minimize the false operation of the foldable cover.

Another advantage of the invention is to provide a touch control arrangement of a container, wherein the foldable cover is moved from the closed position to the opened position by a presence of a touch of a touch actuator, so as to prevent the false operation of the foldable cover.

Another advantage of the invention is to provide a touch control arrangement of a container, wherein the touch control arrangement is located out of the storage cavity of the container so as to maximize the usage volume of the storage cavity.

Another advantage of the invention is to provide a touch control arrangement of a container, wherein the touch control arrangement is protected within a casing to prevent accidental damage to the electrical components of the touch control arrangement and to keep the touch control arrangement under a clean environment, so as to prolong a general life span of the present invention.

Another advantage of the invention is to provide a touch control arrangement of a container, wherein the touch control arrangement requires relatively less electrical energy at a standby mode in comparison with a sensor-type induction arrangement.

Additional advantages and features of the invention will become apparent from the description which follows, and may be realized by means of the instrumentalities and combinations particular point out in the appended claims.

According to the present invention, the foregoing and other objects and advantages are attained by a container, comprising:

a container unit which comprises a container body having a storage cavity and a container opening communicating with the storage cavity, and a foldable cover supporting at the container opening to move between an opened position for exposing the storage cavity through the container opening and a closed position for covering the container opening so as to enclose the storage cavity;

a actuation unit supported by the container body to move the foldable cover between the opened position and the closed position; and a touch control arrangement which comprises a power source and a touch actuator electrically linked to the power source, wherein the touch actuator is located out of the storage cavity of the container body and is arranged in such a manner that when the touch actuator is activated by a presence of a touch, the actuation unit is actuated to move the foldable cover from the closed position to the opened position.

In accordance with another aspect of the invention, the present invention comprises a method of controlling a foldable cover of a container to move between an opened position and a closed position via a touch control arrangement, comprising the steps of:

(a) activating a touch actuator of the touch control arrangement by a presence of a touch; and (b) moving the foldable cover from the closed position to the opened position via an actuation unit in responsive to an activation of the touch actuator.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
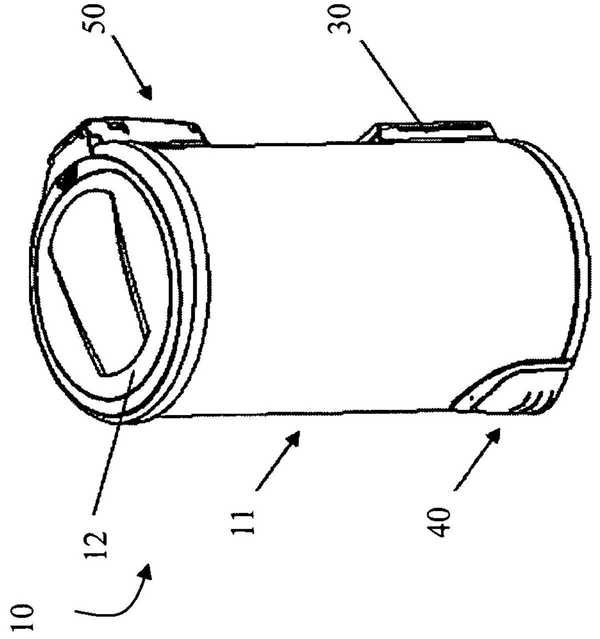
FIG. 1 is a perspective view of a container with a touch control arrangement according to a preferred embodiment of the present invention, illustrating the foldable cover at a closed position.
Figure 2:
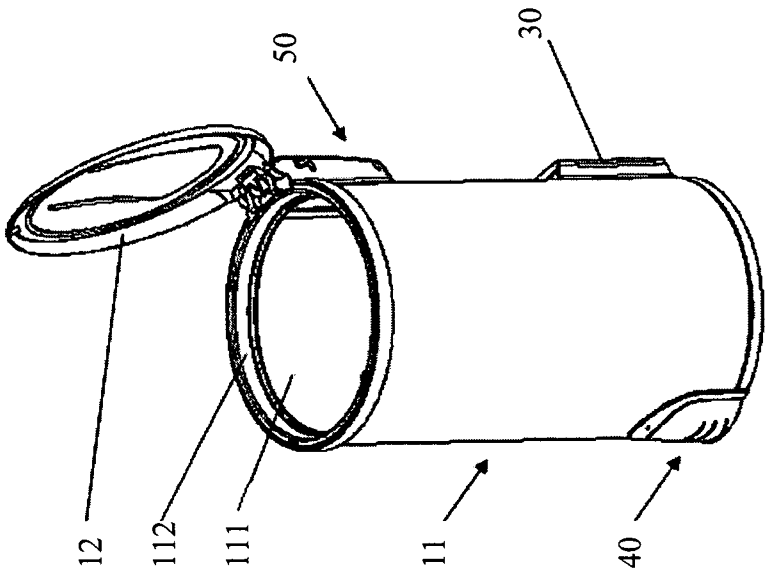
FIG. 2 is a perspective view of the container with the touch control arrangement according to the above preferred embodiment of the present invention, illustrating the foldable cover at an opened position.
Figure 3:
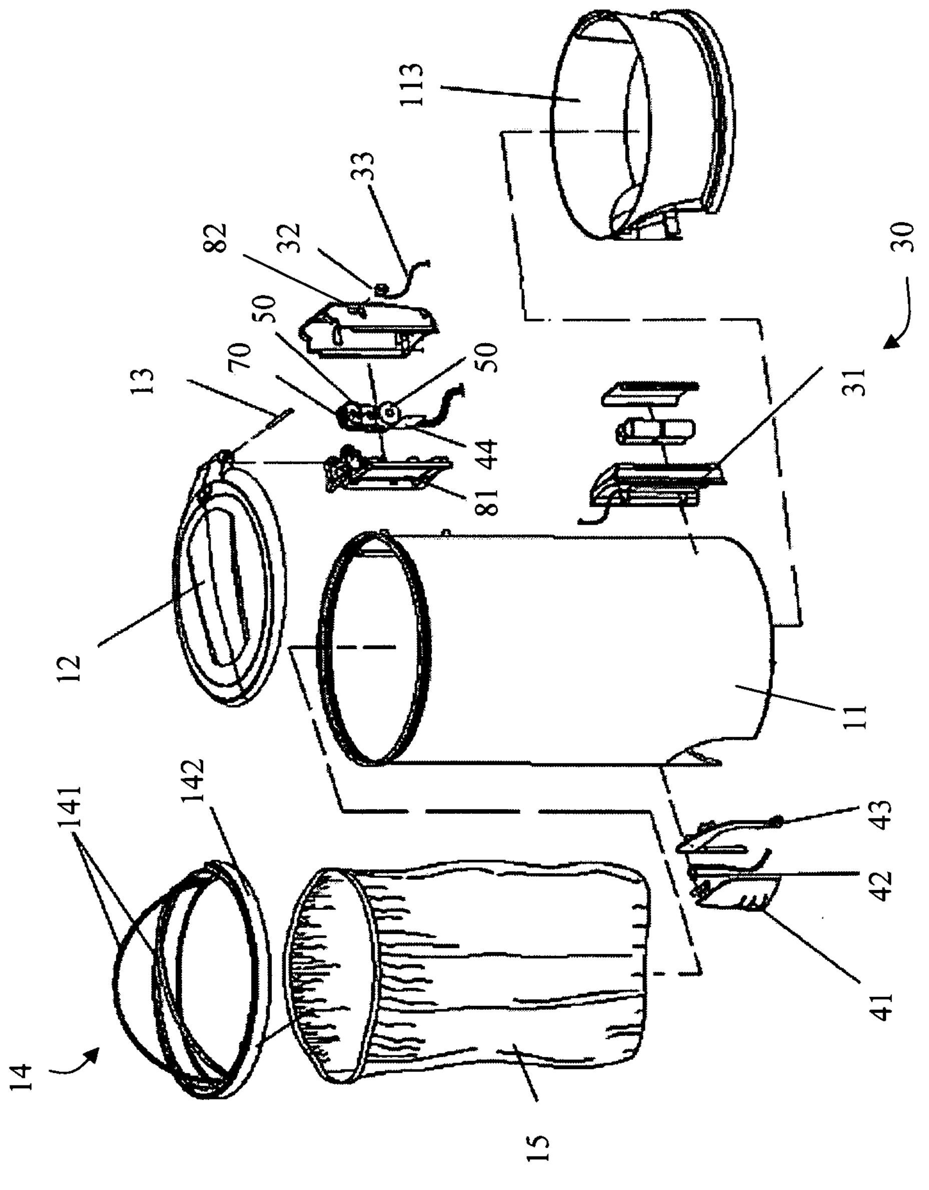
FIG. 3 is an exploded perspective view of the container with the touch control arrangement according to the above preferred embodiment of the present invention.

Referring to FIGS. 1 to 3 of the drawings, a container, such as a trash container, according to a preferred embodiment is illustrated, wherein the container comprises a container unit 10, an actuation unit and a touch control arrangement.

The container unit 10 comprises a container body 11 having a storage cavity 111 and a container opening 112 communicating with the storage cavity 111, and a foldable cover 12 supporting at the container opening 112 to move between an opened position for exposing the storage cavity 111 through the container opening 112 and a closed position for covering the container opening 112 so as to enclose the storage cavity 111. For the trash container as an example, the container body 11 has a circular cross section and defines the container opening 112 at a top opening of the container body 11. The foldable cover 12 is pivotally coupled with the container body 11 at a top edge via a folding joint 13 such that the foldable cover 12 is folded at the closed opened when the foldable cover is pivotally and downwardly folded on top of the container opening 112, as shown in FIG. 1, while the foldable cover 12 is folded at the opened position when the foldable cover 12 is pivotally and upwardly folded, as shown in FIG. 2.

Figure 4:
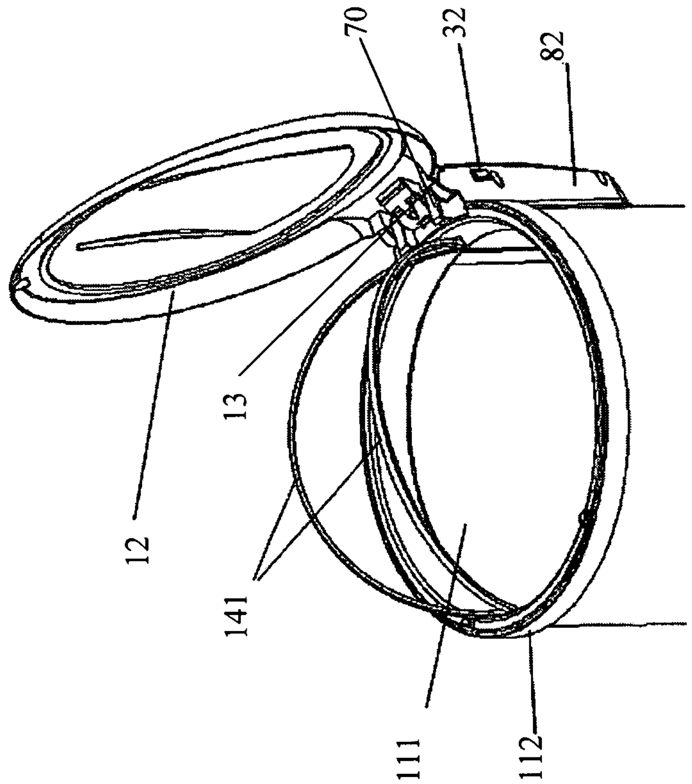
FIG. 4 is a perspective view of the bag holder of the container according to the above preferred embodiment of the present invention.

The container unit 10 further comprises a bag holder 14 for retaining a container bag 15 within the storage cavity 111, as shown in FIGS. 3 and 4, wherein the bag holder 14 comprises two pivot holding arms 141 pivotally folded the storage cavity 111 at a position that the pivot holding arms 141 form a loop configuration to be encircled within the container opening 112 for retaining a bag opening edge of the container bag 15 between the pivot holding arms 141 and an inner wall of the container opening 112 of the container body 11.

As shown in FIG. 4, each of the pivot holding arms 141, having a semi-circular shape, has two pivot ends pivotally coupled within the container opening 112 of the container body 11, such that when the pivot holding arms 141 are upwardly and pivotally folded, the pivot holding arms 141 form two arc shaped handles upwardly extended out of the container opening 112. When the pivot holding arms 141 are downwardly and pivotally folded, the pivot holding arms 141 form the circular loop configuration to be encircled within the container opening 112 of the container body 11.

In particular, the bag holder 14 further comprises a retention ring 142 detachably supported within the container opening 112 of the container body 11, wherein the pivot ends of each of the pivot holding arms 141 are pivotally coupling at an inner side of the retention ring 142 and is arranged in such a manner that when the pivot holding arms 141 are pivotally folded to be encircled within the retention ring 142, the pivot holding arms 141 forms the loop configuration for sandwiching the bag opening edge of the container bag 15 between the retention ring 142 and the loop configuration of the pivot holding arms 141. In other words, the bag opening edge of the container bag is held by the bag holder 14 at the container opening 112 so as to retain the container bag within the storage cavity 111. In addition, when the pivot holding arms 141 are upwardly folded, the pivot holding arms 141 form the handles of the container bag 15 such that the container bag can be easily lifted up to remove the container bag 15 from the container body 11. For example, when the trash bag as the container bag 15 is disposed and retained within the container body 11, the user is able to remove the trash bag by pivotally lifting up the pivot holding arms 141 when the foldable cover 12 is retained at the opened position. It is worth mentioning that the arc shaped pivot holding arms 141 will evenly distribute the weight of the load within the container bag 15 around the bag opening edge such that the user is able to remove the container bag from the container body 11 easily. In addition, when the pivot holding arms 141 are upwardly folded, the pivot holding arms 141 are positioned side-by-side to close the container bag 15 at the bag opening edge.

The actuation unit is supported by the container body 11 to move the foldable cover 12 between the opened position and the closed position in a hand-free manner.

Figure 6:
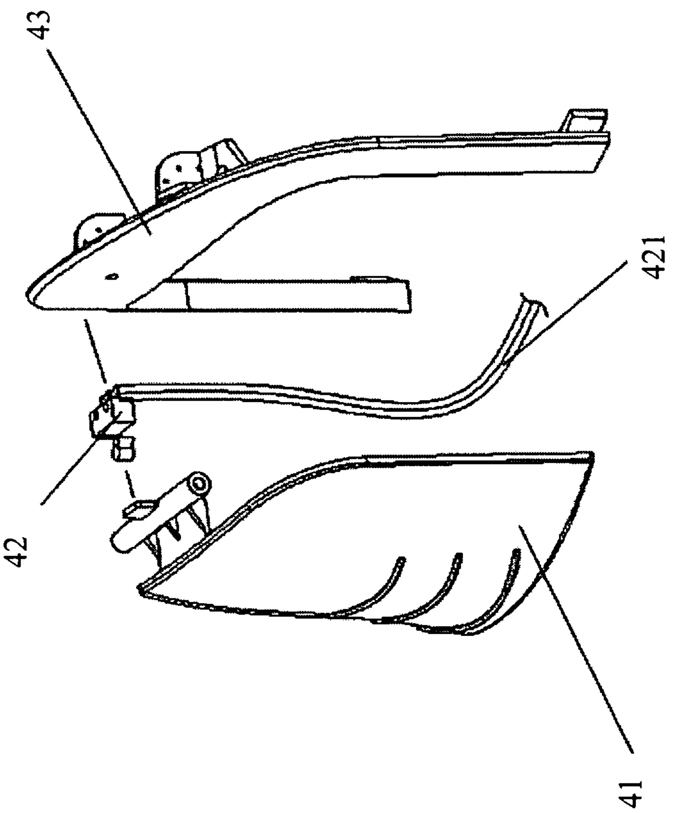
FIG. 6 is an exploded perspective view of the touch control arrangement of the container according to the above preferred embodiment of the present invention.

As shown in FIG. 6, the touch control arrangement comprises a power source 30 and a touch actuator 40 electrically linked to the power source 30, wherein the touch actuator 40 is located out of the storage cavity 111 of the container body 11 and is arranged in such a manner that when the touch actuator 40 is activated by a presence of a touch, the actuation unit is actuated to move the foldable cover 12 from the closed position to the opened position.

As shown in FIGS. 1 and 2, the touch control arrangement is supported at the outer surrounding wall of the container body 11 at a bottom portion thereof to maximize the usage volume of the storage cavity 111 of the container body 11. Preferably, the touch control arrangement is supported at the front side of the container. According to the preferred embodiment, the touch control arrangement is activated by a foot of the user to physically contact with the touch actuator 40.

As shown in FIGS. 3 and 6, the touch actuator 40 comprises a touch panel 41 and a micro switch 42 located behind the touch panel 41 to electrically linked to the power source 30 such that when the touch panel 41 is slightly pressed, the micro switch is activated to actuate the actuation unit.

In particular, the micro switch 42 is an electric switch that is actuated by very little physical force, wherein the micro switch 42 is relatively low cost, small size, and durability. In addition, the micro switch 42 requires relatively small activation movement to be activated such that the touch actuator 41 can be accurately operated by the micro switch 42 through a presence of a touch. The micro switch 42 is electrically linked to the power source 30 via an electric cable 421, wherein the electric cable 421 runs underneath the bottom side of the container body 11 in a hidden manner to prevent accidental damage of the electric cable 421 when folding operation of the foldable cover 12 and the touch operation of the micro switch 42. Accordingly, the container body 11 further comprises a container base 113 formed at the bottom side to hide the electrical cable 421 out of the storage cavity 111. The container base 113 further has an operation cavity indently formed at the front side thereof, wherein the touch actuator 40 is provided at the operation cavity of the container base 113 at a position that the touch panel 41 forms a cover to enclose the operation cavity such that the touch panel 41 forms with the outer surrounding wall of the container body 11 to prevent the actuator 40 being outwardly protruded from the outer surrounding wall of the container body 11 so as to enhance the aesthetic appearance of the container.

The touch panel 41 is pivotally coupled with the outer surrounding wall of the container body 11 for enlarging the contacting area of the micro switch 42 to be activated. Accordingly, since the micro switch 42 is relatively small, the user may not be accurately contact with the micro switch 42 to move the foldable cover 12 between the opened position and the closed position. The touch panel 41 provides enough contacting surface for the user to contact so as to ensure the operation of the micro switch 42. In addition, the micro switch 42 is hidden behind the touch panel 41 which is effectively protected by the touch panel 41 against such adverse environmental factor as excess humidity and unnecessary impact force, so as to prolong a general life span of the micro switch 42.

In order to securely support the touch panel 41 at the container body 11, the touch actuator 40 further comprises a supporting frame 43 supported at the outer surrounding wall of the container body 11, wherein top edge of the touch panel 41 is pivotally coupled with the supporting frame 43 such that the micro switch 42 is activated when the touch panel 41 is pivotally and slightly touched to move towards the outer surrounding wall of the container body 11. As shown in FIGS. 3 and 6, the supporting frame 43 has a U-shaped configuration coupled at the bottom portion of the outer surrounding wall of the container body 11.

The bottom edge of the touch panel 41 is positioned above the bottom side of the container body 11 and is slightly moved away from the outer surrounding wall of the container body 11 to define a gap between the bottom edge of the touch panel 41 and the outer surrounding wall of the container body 11, wherein the distance of the gap is large enough in responsive to the activation movement of the micro switch 42.

The touch control arrangement further comprises a control circuit 44 operatively linked to the touch actuator 40 for controlling the foldable cover 12 between the opened position and the closed position. The control circuit 44 is electrically linked to the micro switch 42, wherein when the micro switch 42 is actuated by a presence of a touch, the control circuit 44 is activated to move the foldable cover 12 from the closed position to the opened position.

The control circuit 44 further controls the foldable cover 12 from the opened position to the closed position. Firstly, the control circuit 44 is activated to move the foldable cover 12 from the opened position to the closed position when the foldable cover 12 is retained at the opened position for a predetermined opening time, for example 3 seconds. In other words, the foldable cover 12 is automatically moved back to the closed position after the opening time period. Accordingly, once the micro switch 42 is activated by the first touch of the touch panel 41, the control circuit 44 will be activated to close the foldable cover 12 for the opening time.

According to the preferred embodiment, when the micro switch 42 is activated by a presence of a touch, the micro switch 42 will send a first activation signal to the control circuit 44, such that the control circuit 44 will receive the first activation signal to move the foldable cover 12 to the opened position from the closed position via the actuation unit. After the opening time starting from the first activation signal, the control circuit 44 will be activated to move the foldable cove 12 back to the closed position via the actuation unit.

Secondly, the control circuit 44 is activated to move the foldable cover 12 from the opened position to the closed position when the touch actuator 40 is activated by a presence of a second touch. Therefore, the user is able to close the foldable cover 12 by a second touch of the touch panel 41 within the opening time period. In other words, when the micro switch 42 is activated by a presence of a second touch within the opening time period, the micro switch 42 will send a second activation signal to the control circuit 44, such that the control circuit 44 will receive the second activation signal to move the foldable cover 12 back to the closed position from the opened position via the actuation unit.

In order to retain the foldable cover 12 at the opened position, the user is able to keep touching the touch panel 41 to maintain the micro switch 42 at the activation mode, such that the control circuit 44 will keep activate to maintain the foldable cover 12 at the opened position. Therefore, when the micro switch 42 is activated by a presence of a first touch continuously, the micro switch 42 will keep sending the first activation signal to the control circuit 44, such that the control circuit 44 will receive the first activation signal to retain the foldable cover 12 at the opened position until the first touch is released from the micro switch 42.

Figure 7:
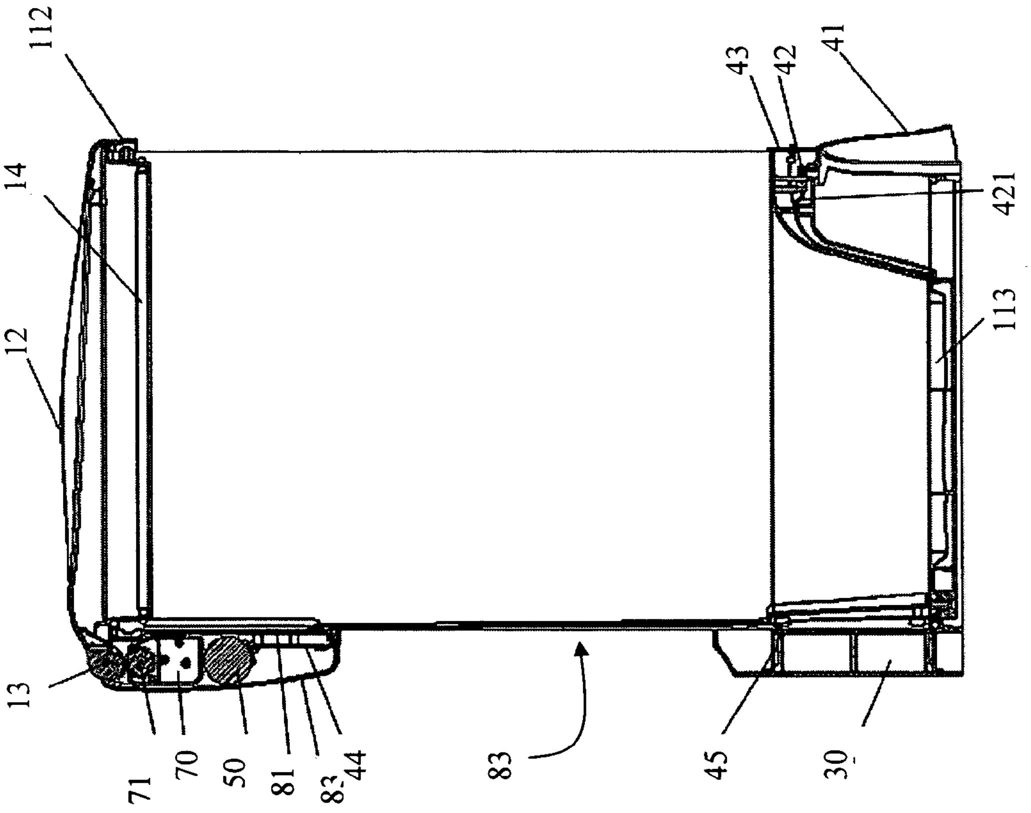
FIG. 7 is a sectional view of the container according to the above preferred embodiment of the present invention.

As shown in FIGS. 3 and 7, the power source 30 comprises a power source housing 31 provided at the bottom portion of the outer surrounding wall of the container body 11 at a position opposite to the touch actuator for one or more batteries receiving in the power source housing 31. Preferably, the power source housing 31 is positioned at the rear side of the container body 11. The power source housing 31 has a battery cavity for the batteries receiving therein and a detachable cover detachably coupling with the power source housing 31 to enclose the battery cavity. Accordingly, the batteries can be replaceable batteries that the batteries can be replaced by detaching the detachable cover. The batteries can also be the rechargeable batteries that a power cable is electrically connected to the rechargeable batteries. It is appreciated that the power source 30 can be an AC power cable extending from the rear side of the container body 11 to electrically connect to a power outlet.

The actuation unit is located at the outer surrounding wall of the container body 11 at an upper portion thereof to align with the power source 30. Accordingly, the actuation unit is located at the rear side of the container body 11 at a position close to the container opening 112.

Figure 5:
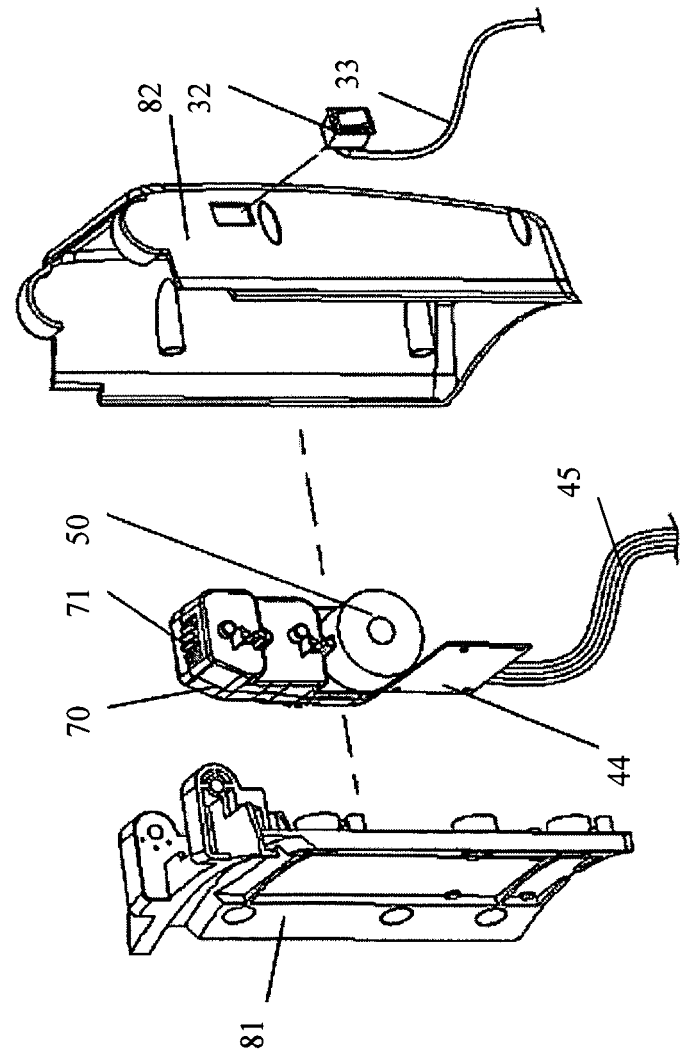
FIG. 5 is an exploded perspective view of the actuation unit of the container according to the above preferred embodiment of the present invention.
Figure 10:
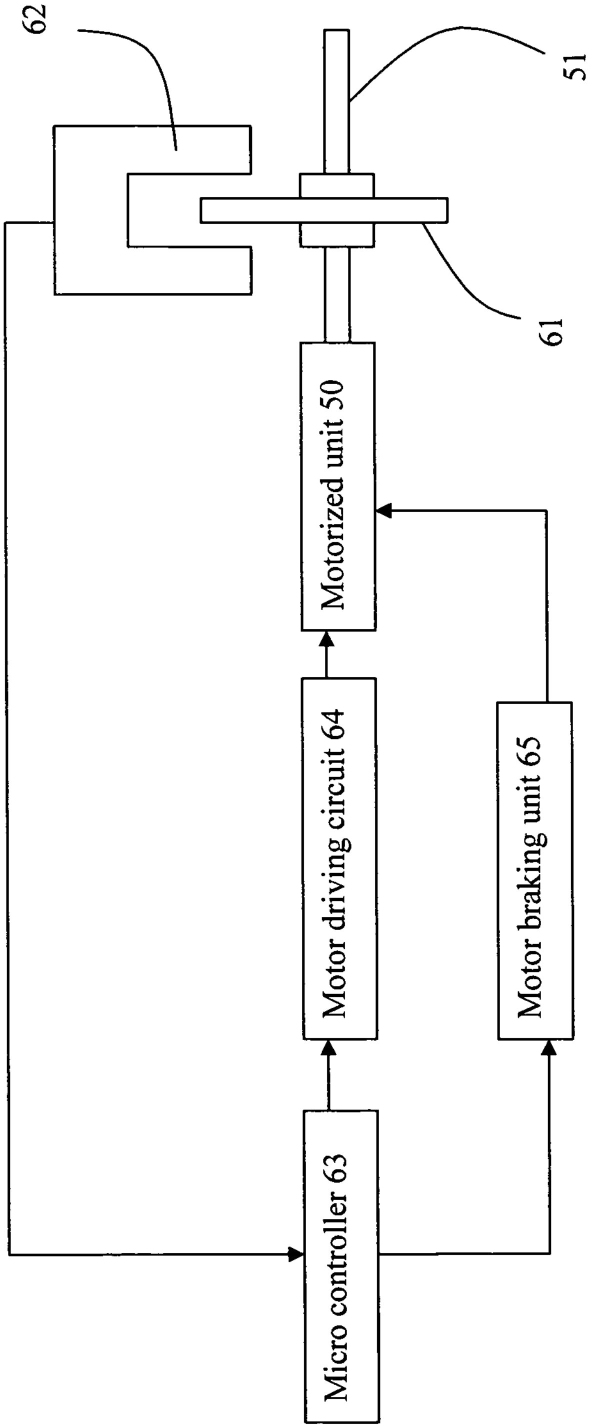
FIG. 10 is a block diagram illustrating the structural configuration of the DC motor assembly according to the above preferred embodiment of the present invention.
Figure 11:
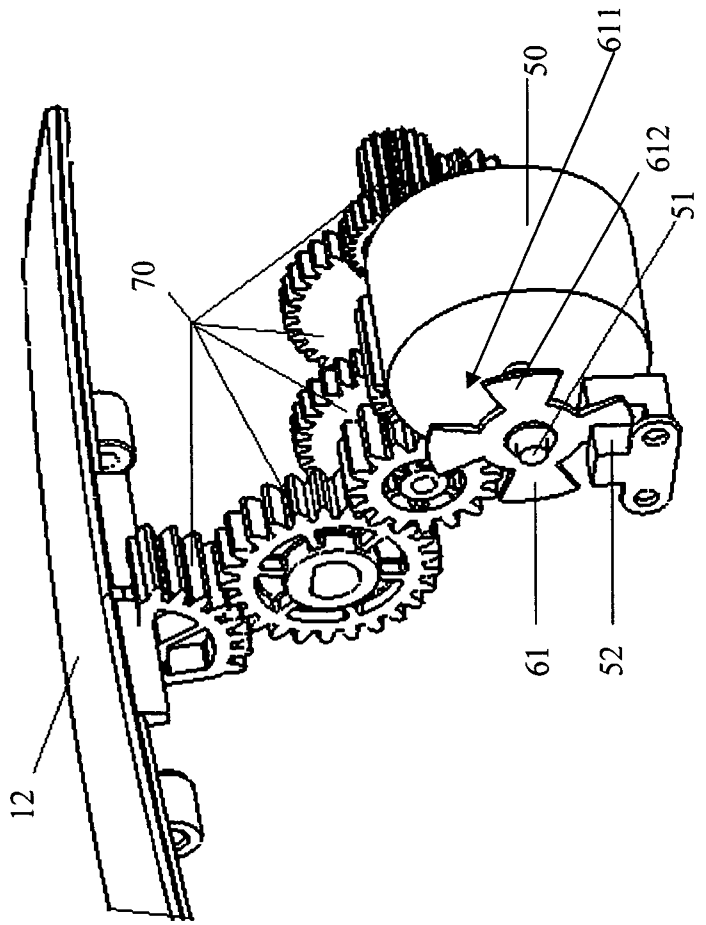
FIG. 11 is a perspective view of the DC motor assembly according to the above preferred embodiment of the present invention.

As shown in FIGS. 5, 10, and 11, the actuation unit comprises a DC motor assembly for generating a rotatable power and a gear unit 70 coupling between the DC motor assembly and the folding joint 13 of the foldable cover 12 for transmitting the rotatable power to the foldable cover 12 so as to move the foldable cover 12 between the opened position and the closed position. The DC motor assembly comprises a motorized unit 50 and a step adjusting control arrangement 60. In particular, the gear unit 70 has an output gear 71 coupling with the folding joint 13 to move the foldable cover 12 between the opened position and the closed position.

The motorized unit 50, which is adapted for electrically connecting with a DC power source, comprises an output shaft 51 for generating a rotatable power. Accordingly, the motorized unit 50 is a magnetic coil induction type motor, wherein the output shaft 51 is adapted to be selectively driven at a first rotational direction or at a reversed second rotational direction. In other words, when a direct voltage is applied at the motorized unit 50, the output shaft 51 is driven to rotate at a clockwise direction. When an inverse voltage is applied at the motorized unit 50, the output shaft 51 is driven to rotate at a counter-clockwise direction. In particular, the motorized unit 50 is embodied as a permanent magnet type DC motor.

The step adjusting control arrangement 60 comprises an optical grating 61 and a photocoupler 62 to control the rotational power of the output shaft 51 of the motorized unit 50.

Figure 13:
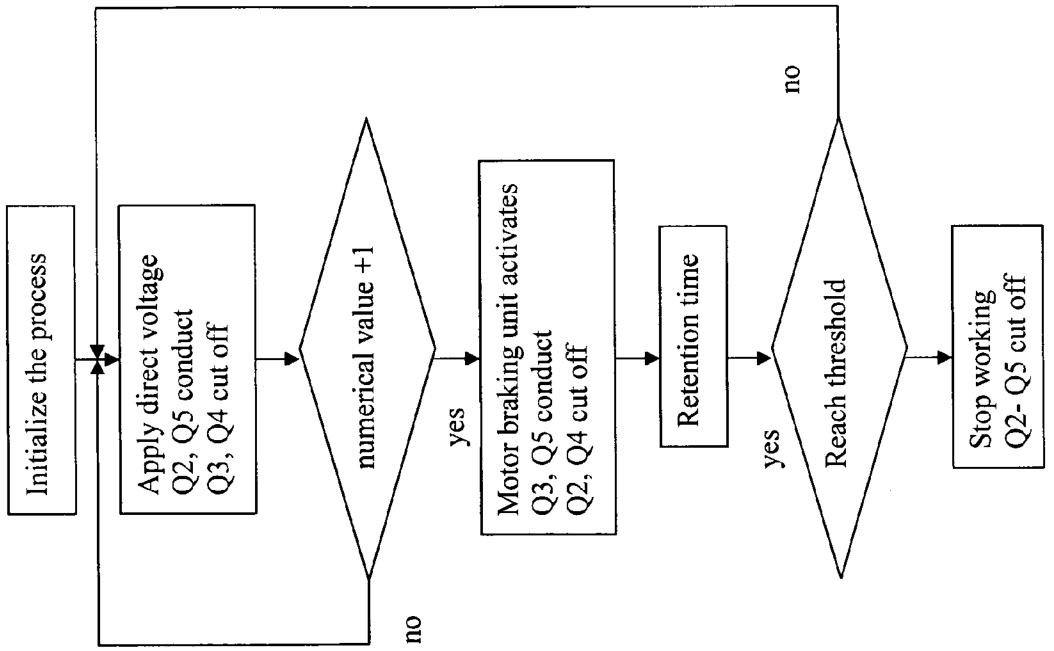
FIG. 13 is a flow diagram illustrating a method of controlling a rotational speed of an output shaft of a motorized unit by the DC motor assembly according to the above preferred embodiment of the present invention.

The present invention further comprises a method of controlling the rotational speed of the output shaft 51 of a motorized unit 50 by the DC motor assembly as shown in FIG. 13, wherein the method comprises the following steps.

(1) Drive an optical grating 61 to rotate corresponding to a rotational movement of the output shaft 51, wherein the light transmissible portions 611 of the optical grating 61 are alternating with the light blocking portions 612, such that the light transmissible portions 611 and the light blocking portions 612 are phase shifting when the output shaft 51 is start rotating.

(2) Send out the impulse signal by the photocoupler 62 in responsive to a phase shift between the light transmissible portion 611 and the light blocking portion 612 of the optical grating 61.

(3) Controllably drive the output shaft 51 to be rotated and stopped in a sequent manner as a stepping movement thereof in responsive to the impulse signal so as to controllably adjust the rotational speed of the output shaft 51.

According to the preferred embodiment, the optical grating 61 is operatively coupled at the output shaft 51, wherein the optical grating 61 has a plurality of light transmissible portions 611 and a plurality of light blocking portions 612 alternating with the light transmissible portions 611.

The photocoupler 62 is activated to send out an impulse signal in responsive to a phase shift between the light transmissible portion 611 and the light blocking portion 612 of the optical grating 61, wherein the rotational speed, an angular movement and number of revolution of the output shaft 51 are controllably adjusted in responsive to the impulse signal of the photocoupler 62.

Accordingly, the optical grating 61 is coaxially coupled at the output shaft 51, wherein the optical grating 61 is driven to rotate corresponding to a rotational movement of the output shaft 51. In other words, the rotational movement of the optical grating 61 is synchronized with the rotational movement of the output shaft 51.

In particular, the optical grating 61 has a thin circular disk shape that the light transmissible portions 611 and the light blocking portions 612 of the optical grating 61 are radially and evenly formed to communicate with the photocoupler 62, as shown in FIG. 11. Preferably, the optical grating 61 has a center portion coaxially coupled at the output shaft 51 and a plurality of extending portions radially extended from the center portion to define the light blocking portions 612 at the extending portions respectively, wherein each of the light transmissible portions 611 is defined at a gap between two adjacent extending portions.

Accordingly, the light transmission path of the photocoupler 62 can pass through each of the light transmissible portions 611 of the optical grating 61 while the light transmission path of the photocoupler 62 is blocked by each of the light blocking portions 612 of the optical grating 61.

The photocoupler 62 comprises a light transmitter, such as an infrared transmitter and a light receiver, such as an infrared receiver, wherein the infrared transmitter is embodied as an infrared transmitting diode and the infrared receiver is embodied as an infrared receiving triode. In other words, the light transmission path is transmitted from the light transmitter to the light receiver through the optical grating 61.

The step adjusting control arrangement 60 further comprises a micro controller 63 operatively linked to an output terminal of the photocoupler 62. Accordingly, the photocoupler 62 is arranged to send out the impulse signal to the micro controller 63 at each phase location of the light transmissible portions 611 and the light blocking portions 612 of the optical grating 61. Therefore, the micro controller 63 will determine the angular movement and number of revolution of the output shaft 51 in responsive to the phase shift of the light transmissible portions 611 and the light blocking portions 612 of the optical grating 61.

The step adjusting control arrangement 60 further comprises a motor driving circuit 64 operatively linked between the micro controller 63 and the motorized unit 50, wherein an input terminal of the motor driving circuit 64 is operatively linked to the terminal of the micro controller 63 while an output terminal of the motor driving circuit 64 is operatively linked to the motorized unit 50. Accordingly, the motor driving circuit 64 is arranged to control the motorized unit 50 in an on-and-off manner, wherein when the motor driving circuit 64 applies a direct voltage at the motorized unit 50, the output shaft 51 is driven to rotate.

Accordingly, the step adjusting control arrangement 60 further comprises a motor braking unit 65 operatively linked to the motorized unit 50 to immediately stop the inertia rotational movement of the output shaft 51. The motor braking unit 65 is embodied as a circuit configured with diodes, transistors, and resistors. The motor braking unit 65 is arranged to cut off the DC power the motorized unit 50 at its two terminals from the DC power source. When the power of the motorized unit 50 is cut off, the output shaft 51 will keep rotating by the inertia of the load at the output shaft 51 and the rotor of the motorized unit 50. Therefore, the motorized unit 50 will not be shut off immediately, at the mean time, the motorized unit 50 will become the generator according to the electromagnetic theory. Once the power of the motorized unit 50 is cut off, the motor braking unit 65 will apply a current passing through the coil inside the motorized unit 50 to cut off the line of magnetic field so as to generate a resistance force to instantly stop the rotatable power from the motorized unit 50. In other words, the motor braking unit 65 will apply the inverse voltage to the motorized unit 50 to immediately stop the inertia rotational movement of the output shaft 51 when the output shaft 51 is rotating.

Accordingly, the step (3) of the present invention further comprises the following steps.

(3.1) Apply a direct voltage to the motorized unit 50 via the motor driving circuit 64 to drive the output shaft 51 to rotate.

(3.2) Apply an inverse voltage to the motorized unit 50 via the motor braking unit 65 to immediately stop the rotational movement of the output shaft 51 so as to provide the stepping movement of the output shaft 51.

Figure 8:
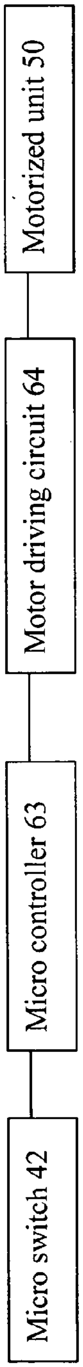
FIG. 8 is a block diagram of the container according to the above preferred embodiment of the present invention.

Accordingly, the output terminal of the micro controller 63 is operatively linked to the motor driving circuit 64, wherein the micro switch 42 is operatively linked to the micro controller 63 while the motor driving circuit 64 is operatively linked to the motorized unit 50, as shown in FIG. 8, such that when the micro controller 63 is controlled to activate the motor driving circuit 64, the motor driving circuit 64 will apply a predetermined voltage at the two terminals of the motorized unit 50, so as to actuate the motorized unit 50 for generating the rotatable power at the output shaft 51. The optical grating 61 is driven to rotate correspondingly by the output shaft 51 to shift the alternating positions of the light transmissible portions 611 and the light blocking portions 612 of the optical grating 61. The photocoupler 62 will send out the impulse signal to the micro controller 63 at each phase location of the light transmissible portions 611 and the light blocking portions 612 of the optical grating 61. In responsive to the impulse signal, the output terminal of the micro controller 63 will correspondingly adjust the output signal to the motor driving circuit 64 so as to stop applying the voltage at the two terminals of the motorized unit 50. At the mean time, the motor braking unit 65 is activated to apply the current to the terminals of the motorized unit 50 to immediately stop the rotatable power from the motorized unit 50. Therefore, the output shaft 51 of the motorized unit 50 is stopped rotating for a predetermined retention time. Once the photocoupler 62 sends out the impulse signal to the micro controller 63 at next phase location of the light transmissible portions 611 and the light blocking portions 612 of the optical grating 61, the micro controller 63 will activate the motor driving circuit 64 to drive the motorized unit 50 for generating the rotatable power again. By repeating the above steps, the output shaft 51 will be controlled to rotate and stop in a sequent manner as a stepping movement. In other words, by controlling the retention time of the output shaft 51, the rotational speed of the output shaft 51 can be selectively controlled. In particular, the retention time is controllably adjusted to adjustably decelerate the rotational speed of the output shaft 51.

It is worth mentioning that the micro controller 63 can determine and control the retention time of the output shaft 51 in responsive to the phase location of the light transmissible portions 611 and the light blocking portions 612 of the optical grating 61, so as to control and adjust the angular movement and number of revolution of the output shaft 51. Therefore, the traveling distance of the load through the output shaft 51 can be controllably adjusted.

Figure 12:
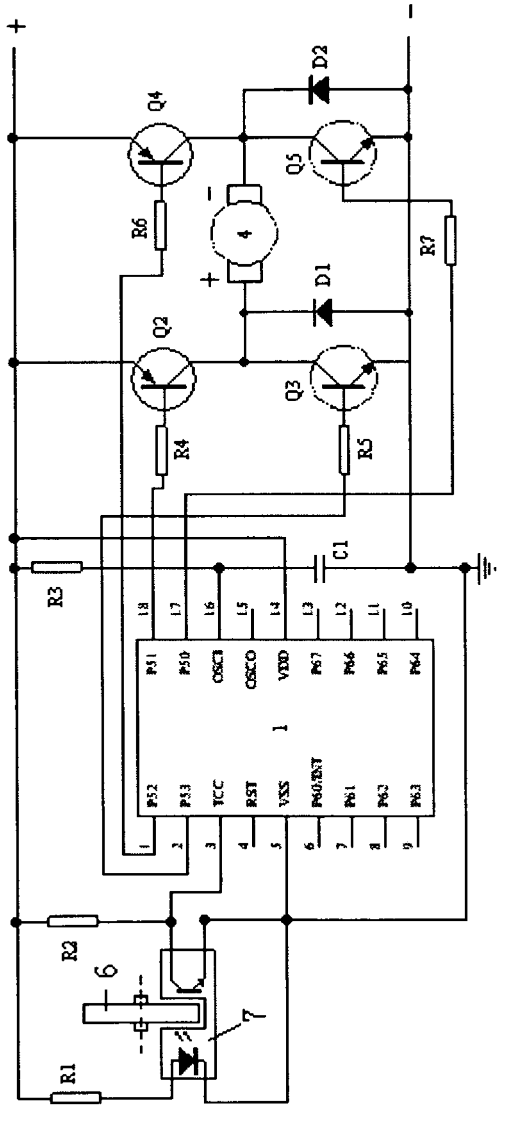
FIG. 12 is a circuit diagram illustrating the circuit configuration of the DC motor assembly according to the above preferred embodiment of the present invention.

As shown in FIG. 12, the motor driving circuit 64 is a circuit configured by a plurality of triodes Q2, Q3, Q4, Q5, and resistors R4, R5, R6, R7. The motor braking unit 65 is a circuit configured by two diodes D1, D2, two triodes Q3, Q4, and resistors R5, R7. The micro controller 63 has a plurality of terminals 1, 2, 17, 18 operatively linked to the triodes Q2, Q3, Q4, Q5 through the resistors R4, R5, R6, R7 respectively. When the terminals 1, 17 of the micro controller 63 are set at a relatively high electric level while the terminals 2, 18 of the micro controller 63 are set at a relatively low electric level, the triodes Q2, Q5 are electrically conducted and the triodes Q3, Q4 are electrically cut off. Therefore, a voltage with forward direction is applied to the motorized unit 50, wherein the output shaft 51 is driven to rotate at a clockwise direction. Likewise, when the terminals 1, 17 of the micro controller 63 are set at a relatively low electric level while the terminals 2, 18 of the micro controller 63 are set at a relatively high electric level, the triodes Q2, Q5 are electrically cut off and the triodes Q3, Q4 are electrically conducted. Therefore, a voltage with reversed direction (inverse voltage) is applied to the motorized unit 50, wherein the output shaft 51 is driven to rotate at a counter-clockwise direction.

The output terminal of the photocoupler 62 is electrically coupled at the terminal 3 of the micro controller 63 which is one of the input terminals thereof. When the light transmission path between the infrared transmitter and the infrared receiver of the photocoupler 62 is blocked by the light blocking portion 612 of the optical grating 61, the terminal 3 of the micro controller 63 is set at a relatively high electric level. When the light transmission path passes between the infrared transmitter and the infrared receiver of the photocoupler 62 through the light transmissible portion 611 of the optical grating 61, the terminal 3 of the micro controller 63 is set at a relatively low electric level. Preferably, there are four light blocking portions 612 provided at the optical grating 61. Therefore, the micro controller 63 will generate four corresponding impulse signals at the terminal 3 for each revolution of the output shaft 51. In other words, the angular step angle of the motorized unit 50 is 90°.

According to the preferred embodiment, the gear unit 70 is coupling between the folding joint 13 of the foldable cover 12 and the DC motor assembly. Preferably, the gear unit 70 is a decelerating gear set to transmit an input rotatable force with high speed and low torque power from the DC motor assembly to an output rotatable force with low speed and high torque power to the folding joint of the foldable cover 12. In other words, the gear unit 70 is a force transmitting unit for transmitting the rotatable power of the DC motor assembly to the foldable cover 12 so as to move the foldable cover 12 between the opened and closed positions. It is worth mentioning that the output rotatable force with low speed and high torque power is a decelerating and torque enhancing force to move the foldable cover 12 to the closed position in a hydraulic manner so as to minimize the unwanted noise generated when the foldable cover 12 directly impacts to the container body 11 at the closed position.

In particular, the motorized unit 11 comprises two output shafts 11 extending opposedly and being driven to rotate at the same speed and direction in a synchronized manner, wherein one of the output shafts 11 is coupled with the optical grating 61 to drive the optical grating 61 correspondingly, while another output shaft 51 is coupled with the gear unit 70.

When the foldable cover is moved to its closed position, the motorized unit 50 will be controlled to generate the rotatable power at the output shaft 51 with relatively low speed manner, such that the output shaft 51 will be driven to rotate slowly. At the mean time, the micro controller 63 will determine the traveling distance of the foldable cover. At the initiate state, the terminals 1, 19 of the micro controller 63 are set at relatively high electric level while the terminals 2, 17 of the micro controller 63 are set at relatively low electric level, wherein the triodes Q2, Q3, Q4, Q5 are all cut off. Therefore, the electrical power of the motorized unit 50 is cut off to remain at an idle condition. After the initiate state, the micro controller 63 modifies its state that the terminals 1, 17 of the micro controller 63 are set at relatively high electric level while the terminals 2, 18 of the micro controller 63 are set at relatively low electric level, i.e. applying the voltage at forward direction (direct voltage), wherein the triodes Q2, Q5 are electrically conducted while the triodes Q3, Q4 are electrically cut off. Therefore, the output shaft 51 is driven to start rotating at a clockwise direction to start moving the foldable cover from the opened position to the closed position. At the same time, the optical grating 61 is driven to rotate corresponding to the output shaft 51. When the optical grating 61 is rotated at 90°, the photocoupler 62 will send the impulse signal to the micro controller 63, wherein the micro controller 63 will digitize the impulse signal, for example by adding 1 value into a unity, in order to modify the output of the micro controller 63.

In particular, the impulse signals are configured as numerical values that when the numerical values reach a preset threshold, the output shaft 51 is completely stopped rotating, and when the numerical values is below the preset threshold, the output shaft 51 repeatedly controlled to be rotated and stopped in a sequent manner until the numerical values reach the preset threshold.

Accordingly, the output of the micro controller 63 is modified that the terminals 1, 2, 18, 17 of the micro controller 63 are set at relatively high electric level. Therefore, the triodes Q2, Q3, Q4, Q5 are all electrically cut off. Then, the motor braking unit 65 is activated to immediately stop the rotational movement of the output shaft 51. The output shaft 51 is controlled to stop its rotational movement for the predetermined retention time. After the retention time, the micro controller 63 will determine the value reaching the preset threshold, i.e. the traveling distance of the foldable cover 12 reaching at the closed position. When the value reaches the preset threshold, i.e. the foldable cover 12 is already moved at the closed position, the motorized unit 50 is stopped working. When the value does not reach the preset threshold, i.e. the foldable cover 12 has not been moved at the closed position, the micro controller 63 will repeat the steps to modify the output thereof until the value reaches the preset threshold. It is worth mentioning that by controllably adjusting the retention time, the rotational speed of the output shaft 51 will be correspondingly adjusted to decelerate the movement of the foldable cover 12 from the opened position to the closed position. Preferably, the output shaft 51 of the motorized unit 50 is stopped rotating at every 90° rotating angle. In addition, through the gear unit 70, the output rotatable force at the output shaft 51 is further decelerated to further reduce the speed of the foldable cover 12 from the opened position to the closed position. Therefore, the foldable cover 12 will be moved to the closed position in a hydraulic manner. It is appreciated that the angular stepping movement of the output shaft 51 can be reduced by increasing the number of the light blocking portions 612 of the optical grating 61. In addition, the optical grating 61 can be supported by one gear of the gear unit, wherein when the gear is driven to rotate by the output shaft 51, the optical grating 61 at the corresponding gear is driven to rotate in responsive to the output shaft 51 for communicating with the photocoupler 62, so as to controllably adjust the angular movement and number of revolution of the output shaft 51.

As shown in FIG. 5, the actuation unit further comprises a base support 81 coupled at the outer surrounding wall of the container body 11 and a casing 82 coupling at the base supporting 81 to define a protection cavity between the base support 81 and the casing 82, wherein the DC motor assembly and the gear unit 70 are received and protected within the protection cavity to prevent accidental damage of the electrical components of the DC assembly when the foldable cover 12 is driven to operate.

The actuation unit further comprises an enclosed channel 83 formed at the outer surrounding wall of the container body 11 to communicate between the foldable arrangement and the power source. Accordingly, the DC motor assembly is electrically connected to the power source 30 via the electric cable 45, wherein the electric cable 45 is received in the enclosed channel 83 at the rear side of the container body 11. In addition, the power source 30 further comprises a main switch 32 provided at the outer side of the casing 82 to electrically link with the power source 30 via a power cable 33 within the enclosed channel 83 so as to switch the power source 30 between on and off conditions. The main switch 32 is provided at the upper portion of the container body 11 for easy reach.

Figure 9:
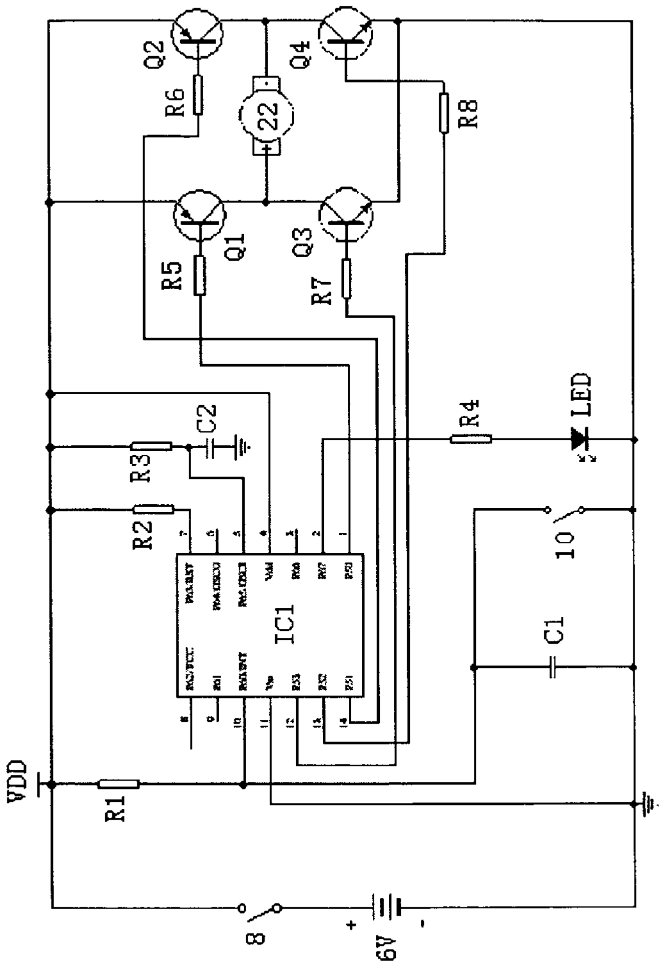
FIG. 9 is a circuit diagram of the container according to the above preferred embodiment of the present invention.

As shown in FIG. 9, when the foot of the user slightly presses at the touch panel 41 to actuate the micro switch 42, the terminal 10 of the micro computing controller (IC1) of the control circuit 44 is shifted from high electric level to low electric level, wherein the micro computing controller (IC1) of the control circuit 44 is shifted from sleep mode to activation mode so as to initialize the operation of the foldable cover 12. Accordingly, the triodes Q1, Q4 of the operation circuit of the micro computing controller (IC1) are electrically conducted while the triodes Q2, Q3 thereof are electrically cut off, so that the output shaft 51 of the motorized unit 50 is rotated at the clockwise direction. The gear unit 70 is driven to move via the rotational movement of the output shaft 51 that the rotatable power of the output shaft 51 is decelerated through the gear unit 70 to the foldable cover 12. Accordingly, the output gear 71 of the gear unit 70 will generate a decelerated rotatable power to move the foldable cover 12 from the closed position to the opened position. At the time when the foldable cover 12 is moved at the opened position, the triodes Q1, Q4, Q2, Q3 at the output terminal of micro computing controller (IC1) are electrically cut off so as to cut off the electric power from the motorized unit 50. The foldable cover 12 will remain at the opened position for the retention time period, such as 3 seconds. The triodes Q1, Q4 at the output terminal of micro computing controller (IC1) are then electrically cut off while the triodes Q2, Q3 are electrically conducted, so that the output shaft 51 of the motorized unit 50 is rotated at the counter clockwise direction. The gear unit 70 is then driven to move via the rotational movement of the output shaft 51 that the rotatable power of the output shaft 51 is decelerated through the gear unit 70 to the foldable cover 12. Accordingly, the output gear 71 of the gear unit 70 will generate a decelerated rotatable power to move the foldable cover 12 back to the closed position from the opened position. After completing one folding operation of the foldable cover 12, the control circuit 44 is then shifted back to the standby mode, wherein the micro computing controller (IC1) is shifted back to the sleep mode. Accordingly, the control circuit 44 will consume about 1 μA current during sleep mode so as to efficiently save the electrical power from the power source 30.

Figure 14:
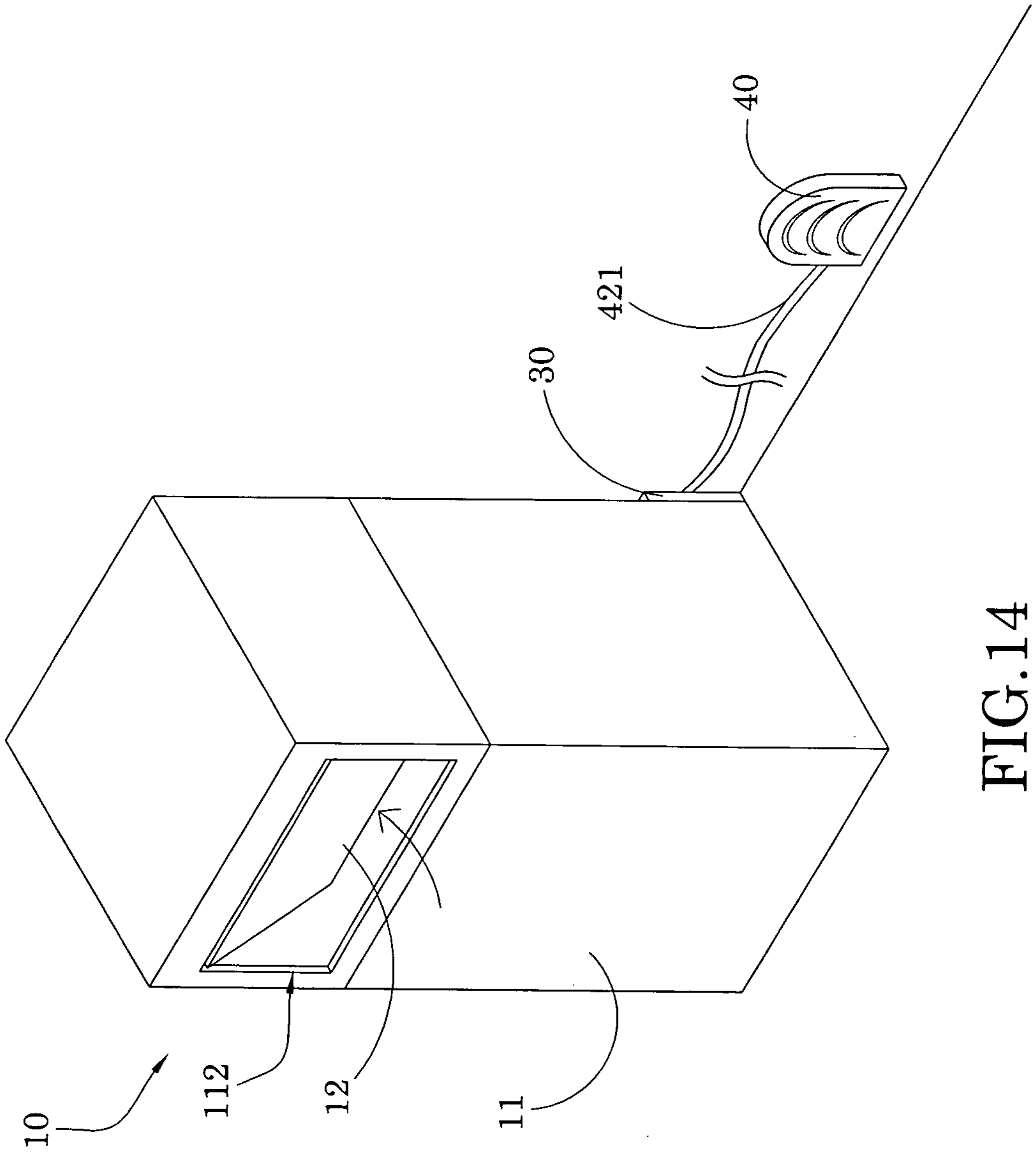
FIG. 14 illustrates an alternative mode of the touch control arrangement of the container according to the above preferred embodiment of the present invention.

As shown in FIG. 14, the touch control arrangement can be extended away from the container unit 10, wherein the touch actuator 40 can be selectively located at a desired location. The touch actuator 40 is electrically linked with the power source 30 at the container body 11 via the electric cable 421. In other words, prolonging the length of the electric cable 421, the touch actuator 40 can be moved far away from the container body 11. Therefore, the user is able to operate the foldable cover 12 without physically pressing the touch actuator 40 at the container body 11. It is appreciated that the container opening 112 is formed at the front side of the container body 11, wherein the foldable cover 12 is rearwardly and pivotally folded to its opened position and is frontwardly and pivotally folded to its closed position, as shown in FIG. 14. In other words, the touch control arrangement can be incorporated with any type of container having the foldable cover 12.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A container, comprising:

a container unit which comprises a container body having a storage cavity and a container opening communicating with said storage cavity, and a foldable cover supporting at said container opening to move between an opened position for exposing said storage cavity through said container opening and a closed position for covering said container opening so as to enclose said storage cavity;

an actuation unit supported by said container body to move said foldable cover between said opened position and said closed position; and a touch control arrangement which comprises a power source and a touch actuator electrically linked to said power source, wherein said touch actuator is located out of said storage cavity of said container body and is arranged in such a manner that when said touch actuator is activated by a presence of a touch, said actuation unit is actuated to move said foldable cover from said closed position to said opened position, wherein said touch actuator comprises a touch panel and a micro switch located behind said touch panel to electrically link to said power source such that when said touch panel is slightly pressed, said micro switch is activated to actuate said actuation unit, wherein said touch actuator further comprises a supporting frame supported by said container body at a position that a top edge of said touch panel is pivotally coupled with said supporting frame such that said micro switch is activated when said touch panel is pivotally touched towards said supporting frame.

2. The container, as recited in claim 1, wherein said touch actuator is provided at an outer surrounding wall of said container body at a bottom portion thereof.

3. The container, as recited in claim 1, wherein said power source comprises a power source housing provided at said bottom portion of said outer surrounding wall of said container body at a position opposite to said touch actuator for one or more batteries receiving in said power source housing.

4. The container, as recited in claim 3, wherein said touch control arrangement further comprises a control circuit operatively linked to said touch actuator for controlling said foldable cover between said opened position and said closed position, wherein said control circuit is activated to move said foldable cover from said opened position to said closed position in condition that: (i) when said foldable cover is retained at said opened position for a predetermined opening time, and (ii) when said touch actuator is activated by a presence of a second touch.

5. The container, as recited in claim 4, wherein said actuation unit comprises a DC motor assembly for generating a rotatable power and a gear unit coupling between said DC motor assembly and said foldable cover for transmitting said rotatable power to said foldable cover so as to move said foldable cover between said opened position and said closed position.

6. The container, as recited in claim 5, wherein said DC motor assembly comprises a motorized unit, which is electrically connected with said power source, comprising an output shaft for generating said rotatable power, and a step adjusting control arrangement for controlling said output shaft to be rotated and stopped in a sequent manner as a stepping movement thereof so as to controllably adjust a rotational speed of said output shaft.

7. The container, as recited in claim 6, wherein said step adjusting control arrangement comprises an optical grating, which is operatively coupled at said output shaft, having a plurality of light transmissible portions and a plurality of light blocking portions alternating with said light transmissible portions, and a photocoupler being activated to send out an impulse signal in responsive to a phase shift between said light transmissible portion and said light blocking portion of said optical grating, wherein said output shaft is controllably driven to be rotated and stopped in a sequent manner as a stepping movement thereof in responsive to said impulse signal so as to controllably adjust said rotational speed of said output shaft.

8. The container, as recited in claim 7, wherein said container unit further comprises a bag holder for retaining a container bag within said storage cavity, wherein said bag holder comprises two pivot holding arms pivotally folded said storage cavity at a position that said pivot holding arms form a loop configuration to be encircled within said container opening for retaining a bag opening edge of said container bag between said pivot holding arms and an inner wall of said container opening of said container body.

9. The container, as recited in claim 8, wherein said bag holder further comprises a retention ring detachably supported within said container opening of said container body, wherein each of said pivot holding arms has two pivot ends pivotally coupling at an inner side of said retention ring and is arranged in such a manner that when said pivot holding arms are pivotally folded to be encircled within the retention ring, said pivot holding arms forms said loop configuration for sandwiching said bag opening edge of said container bag between said retention ring and said pivot holding arms.

10. The container, as recited in claim 4, wherein said container unit further comprises a bag holder for retaining a container bag within said storage cavity, wherein said bag holder comprises two pivot holding arms pivotally folded said storage cavity at a position that said pivot holding arms form a loop configuration to be encircled within said container opening for retaining a bag opening edge of said container bag between said pivot holding arms and an inner wall of said container opening of said container body.

11. The container, as recited in claim 10, wherein said bag holder further comprises a retention ring detachably supported within said container opening of said container body, wherein each of said pivot holding arms has two pivot ends pivotally coupling at an inner side of said retention ring and is arranged in such a manner that when said pivot holding arms are pivotally folded to be encircled within the retention ring, said pivot holding arms forms said loop configuration for sandwiching said bag opening edge of said container bag between said retention ring and said pivot holding arms.

12. A container, comprising:

a container unit which comprises a container body having a storage cavity and a container opening communicating with said storage cavity, and a foldable cover supporting at said container opening to move between an opened position for exposing said storage cavity through said container opening and a closed position for covering said container opening so as to enclose said storage cavity;

an actuation unit supported by said container body to move said foldable cover between said opened position and said closed position; and a touch control arrangement which comprises a power source and a touch actuator electrically linked to said power source, wherein said touch actuator is located out of said storage cavity of said container body and is arranged in such a manner that when said touch actuator is activated by a presence of a touch, said actuation unit is actuated to move said foldable cover from said closed position to said opened position, wherein said touch control arrangement further comprises a control circuit operatively linked to said touch actuator for controlling said foldable cover between said opened position and said closed position, wherein said control circuit is activated to move said foldable cover from said opened position to said closed position in condition that: (i) when said foldable cover is retained at said opened position for a predetermined opening time, and (ii) when said touch actuator is activated by a presence of a second touch.

13. The container, as recited in claim 12, wherein said touch actuator is provided at an outer surrounding wall of said container body at a bottom portion thereof, wherein said touch actuator comprises a touch panel and a micro switch located behind said touch panel to electrically link to said power source such that when said touch panel is slightly pressed, said micro switch is activated to actuate said actuation unit.

14. A container, comprising: a container unit which comprises a container body having a storage cavity and a container opening communicating with said storage cavity, and a foldable cover supporting at said container opening to move between an opened position for exposing said storage cavity through said container opening and a closed position for covering said container opening so as to enclose said storage cavity;

an actuation unit supported by said container body to move said foldable cover between said opened position and said closed position; and a touch control arrangement which comprises a power source and a touch actuator electrically linked to said power source, wherein said touch actuator is located out of said storage cavity of said container body and is arranged in such a manner that when said touch actuator is activated by a presence of a touch, said actuation unit is actuated to move said foldable cover from said closed position to said opened position, wherein said actuation unit comprises a DC motor assembly for generating a rotatable power and a gear unit coupling between said DC motor assembly and said foldable cover for transmitting said rotatable power to said foldable cover so as to move said foldable cover between said opened position and said closed position, wherein said DC motor assembly comprises a motorized unit, which is electrically connected with said power source, comprising an output shaft for generating said rotatable power, and a step adjusting control arrangement for controlling said output shaft to be rotated and stopped in a sequent manner as a stepping movement thereof so as to controllably adjust a rotational speed of said output shaft, wherein said step adjusting control arrangement comprises an optical grating, which is operatively coupled at said output shaft, having a plurality of light transmissible portions and a plurality of light blocking portions alternating with said light transmissible portions, and a photocoupler being activated to send out an impulse signal in responsive to a phase shift between said light transmissible portion and said light blocking portion of said optical grating, wherein said output shaft is controllably driven to be rotated and stopped in a sequent manner as a stepping movement thereof in responsive to said impulse signal so as to controllably adjust said rotational speed of said output shaft.

15. A container, comprising: a container unit which comprises a container body having a storage cavity and a container opening communicating with said storage cavity, and a foldable cover supporting at said container opening to move between an opened position for exposing said storage cavity through said container opening and a closed position for covering said container opening so as to enclose said storage cavity;

an actuation unit supported by said container body to move said foldable cover between said opened position and said closed position; and a touch control arrangement which comprises a power source and a touch actuator electrically linked to said power source, wherein said touch actuator is located out of said storage cavity of said container body and is arranged in such a manner that when said touch actuator is activated by a presence of a touch, said actuation unit is actuated to move said foldable cover from said closed position to said opened position, wherein said container unit further comprises a bag holder for retaining a container bag within said storage cavity, wherein said bag holder comprises two pivot holding arms pivotally folded said storage cavity at a position that said pivot holding arms form a loop configuration to be encircled within said container opening for retaining a bag opening edge of said container bag between said pivot holding arms and an inner wall of said container opening of said container body.

16. The container, as recited in claim 15, wherein said bag holder further comprises a retention ring detachably supported within said container opening of said container body, wherein each of said pivot holding arms has two pivot ends pivotally coupling at an inner side of said retention ring and is arranged in such a manner that when said pivot holding arms are pivotally folded to be encircled within the retention ring, said pivot holding arms forms said loop configuration for sandwiching said bag opening edge of said container bag between said retention ring and said pivot holding arms.

17. A method of controlling a foldable cover of a container to move between an opened position and a closed position via a touch control arrangement, comprising the steps of:

(a) activating a touch actuator of said touch control arrangement by a presence of a touch;

(b) moving said foldable cover from said closed position to said opened position via an actuation unit in responsive to an activation of said touch actuator; and (c) moving said foldable cover from said opened position to said closed position in condition that: (i) when said foldable cover is retained at said opened position for a predetermined opening time, and (ii) when said touch actuator is activated by a presence of a second touch.

18. The method, as recited in claim 17, wherein the step (a) further comprises the steps of: (a.1) providing a touch panel of said touch actuator at an outer surrounding wall of said container and a micro switch of said touch actuator located behind said touch panel; and (a.2) slightly pressing said touch panel towards said outer surrounding wall of said container to activate said micro switch, wherein, in the step (a.1), a top edge of said touch panel is pivotally coupled at said outer surrounding wall of said container at a bottom portion thereof via a supporting frame.

19. The method, as recited in claim 18, further comprising a step of retaining said foldable cover at said opened position by keep touching said touch actuator.

20. The method, as recited in claim 19, further comprising a step of configuring a power source to electrically link with said touch actuator that said power source is located out of a storage cavity of said container.

21. The method, as recited in claim 20, wherein the step (c) further comprises the steps of: (c.1) generating a rotatable power from a DC motor assembly of said actuation unit via an output shaft, wherein said output shaft is controllably driven to be rotated and stopped in a sequent manner as a stepping movement thereof so as to controllably adjust said rotational speed of said output shaft; (c.2) transmitting said rotatable power to said foldable cover via a gear unit so as to move said foldable cover from said opened position to said closed position in a hydraulic manner.

22. The method, as recited in claim 21, wherein the step (c.2) further comprises a step of decelerating said rotational speed of said output shaft to said foldable cover via said gear unit.

23. The method, as recited in claim 18, wherein the step (c) further comprises the steps of: (c.1) generating a rotatable power from a DC motor assembly of said actuation unit via an output shaft, wherein said output shaft is controllably driven to be rotated and stopped in a sequent manner as a stepping movement thereof so as to controllably adjust said rotational speed of said output shaft; (c.2) transmitting said rotatable power to said foldable cover via a gear unit so as to move said foldable cover from said opened position to said closed position in a hydraulic manner.

24. The method, as recited in claim 23, wherein the step (c.2) further comprises a step of decelerating said rotational speed of said output shaft to said foldable cover via said gear unit.

* * * * *